United States Patent [19]
Yoshizawa

[11] Patent Number: 6,086,983
[45] Date of Patent: Jul. 11, 2000

[54] LAMINATED GLASS AND AUTOMOBILE WINDOW

[75] Inventor: Hideo Yoshizawa, Osaka, Japan

[73] Assignee: Nippon Sheet Glass Co., Ltd., Osaka, Japan

[21] Appl. No.: 09/126,837

[22] Filed: Jul. 30, 1998

[30] Foreign Application Priority Data

Aug. 6, 1997 [JP] Japan .................................. 9-212209

[51] Int. Cl.[7] .............................. B32B 7/02; B32B 17/10; C03C 27/12
[52] U.S. Cl. ......................... 428/215; 156/102; 296/84.1; 428/436; 428/437
[58] Field of Search ............................. 156/102; 428/215, 428/436, 437; 296/84.1

[56] References Cited

U.S. PATENT DOCUMENTS 3,806,400  4/1974  Laethem ................................ 52/223.1

FOREIGN PATENT DOCUMENTS 63-56230  4/1988  Japan .

*Primary Examiner*—D. S. Nakarani
*Attorney, Agent, or Firm*—Merchant & Gould P.C.

[57] ABSTRACT

The force, by which the glass sheets of a laminated glass push onto each other, is applied to the edges of the laminated glass to prevent the delamination of the laminated glass caused by moisture penetrating or diffusing from these edges into the intermediate film. A pair of glass sheets having different curvatures, in which if the pair of glass sheets are laid on each other, aligning their edges, their central portions are apart from each other and do not adhere to each other, and in which if bent, their surfaces adhere to each other, are bonded with a PVB film, while being bent so that their surfaces adhere to each other to form a laminated glass. At the edges of the laminated glass, in the portion where the glass sheets try to regain their original shapes to push onto each other through the intermediate film, the delamination of the glass sheets is inhibited.

16 Claims, 3 Drawing Sheets

LAMINATED GLASS AND AUTOMOBILE WINDOW

FIELD OF THE INVENTION

The present invention relates to a laminated glass and an automobile window.

BACKGROUND OF THE INVENTION

A laminated glass as well as a tempered glass is widely used as a so-called safety glass for an automobile window. Such a laminated glass is manufactured by laminating two glass sheets with a plastic intermediate film. A polyvinyl butyral resin (PVB) film is generally used as the plastic intermediate film. The PVB film is an excellent material for a laminated glass intermediate film. However, it is known that its adhesive strength decreases due to moisture. In particular, if the moisture content of the PVB film is higher than a certain value, the laminated glass can be delaminated due to a rapid decrease in adhesive strength. Since the delamination causes a decrease in the transparency of the glass, consideration is given to the process for manufacturing a laminated glass and the atmosphere for storing PVB films so as not to increase the moisture content of PVB films.

However, a laminated glass, rather than a tempered glass, has recently been employed not only for a windshield of an automobile but also for a side window. The edge of a glass sheet in a side window is often exposed to the air because the glass sheet needs to be raised or lowered. With such a use that the edge can be exposed, and the penetration and diffusion of moisture from the exposed edge decreases the adhesive strength of the PVB film during a long-term use.

In order to solve such a problem, the following methods are proposed.

(a) Improving the composition of the intermediate film so that its adhesive strength is not easily decreased by moisture.

(b) Filling the edge portions of a laminated glass with a single sealing agent of modified silicone (e.g. see Publication of Japanese Unexamined Utility Model Application No. 63-56230).

(c) Placing a gasket at the edge portion of a laminated glass and injecting a polymeric monomer in a gap formed.

The method of (a) reduces the decrease in adhesive strength to some degree. However, the adhesive film is mainly composed of PVB as well, so that the decrease in adhesive strength due to moisture cannot be solved completely. The method of (b) is effective for preventing the penetration of moisture. However, the appearance of the edges of the glass sheet is damaged by sealing. Also, the manufacturing cost is increased by adding a sealing agent injecting process. The method of (c) has problems from a viewpoint of appearance and manufacturing cost, similar to those of the method of (b).

SUMMARY OF THE INVENTION

In the light of the above problems, it is an object of the present invention to provide a laminated glass that is adapted to inhibit the delamination caused by the penetration of moisture from its edges and does not cause a new problem from a viewpoint of appearance or the like, and an automobile window comprising the same.

In order to achieve the above object, an embodiment of the laminated glass of the present invention comprises a pair of glass sheets having different cross-sectional shapes. The glass sheets are bonded with an intermediate film while being deformed in such a manner that surfaces of the glass sheets adhere to each other so that the glass sheets push onto each other through the intermediate film in a region including at least a part of the edges of the glass sheets.

According to such a laminated glass, the delamination of the glass sheets at the edge of the laminated glass is inhibited even if the adhesive strength of the intermediate film is decreased by the penetration of moisture because the force by which the glass sheets push onto each other acts on the edge of the laminated glass. The edge of the glass, where the force by which the glass sheets push onto each other is applied, may be the entire edges of the laminated glass (that is, the entire periphery of the laminated glass) or a part of the edges. However, it is preferable that such an edge includes at least an edge that can be exposed to the air in use. Also, the laminated glass can be adapted to inhibit the delamination of the glass sheets without using an edge protective material such as a gasket, provides excellent appearance, and does not require a new member or material which increases the manufacturing cost.

Another embodiment of the laminated glass of the present invention is produced by bonding the surfaces of glass sheets are that are not parallel to each other with an intermediate film. When the glass sheets are superimposed on each other without the intermediate film so that the surfaces to be bonded face each other, the surfaces of the glass sheet are separate from each other in at least a part of the surfaces in such a range that the surfaces adhere to each other when at least one of the glass sheets is elastically deformed.

The force by which the glass sheets push onto each other through the intermediate film is applied to the edges of the glass sheets as in the above laminated glass. Therefore, the delamination of the glass sheets at their edges, caused by the penetration and diffusion of moisture, can be inhibited without using an edge protective material.

DESCRIPTION OF THE PREFERRED EMBODIMENTS

Figure 1:
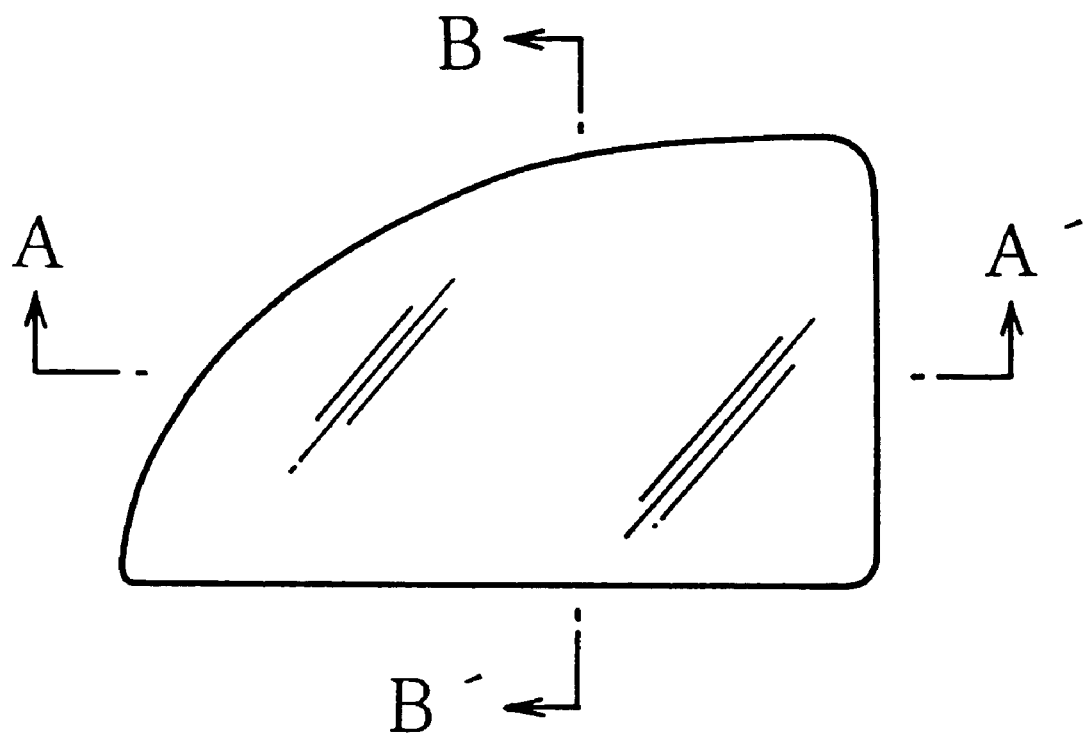
FIG. 1 is a plan view of an embodiment of the laminated glass of the present invention.

The preferred embodiments of the present invention will be described below with reference to the drawings.

It is preferable that the maximum space between the surfaces of the glass sheets intended to compose the laminated glass, when superimposed on each other without the intermediate film, is 1 mm or more. According to using such a pair of the glass sheets, the delamination of the glass sheets is inhibited more effectively. From a similar viewpoint, it is preferable that the maximum space between the separate surfaces is 2 mm or more. Here, the maximum space between the separate surfaces refers to "d" in FIG. 2, a cross-sectional view of an example of a pair of glass sheets for the laminated glass. The upper limit of the maximum space between the separate surfaces is not limited. The maximum space may be within such a range that the surfaces of the glass sheets adhere to each other when the glass sheets are elastically deformed without being broken.

In the laminated glass, it is preferable that each glass sheet has a thickness of 1.5 to 3 mm, because a compressive stress effective for inhibiting the delamination can be applied to the edges of the glass. If the thickness of the glass sheet is above 3 mm, the rigidity increases, so that the glass sheet does not bend easily. Therefore, two such glass sheets having different shapes cannot be adhered easily with an intermediate film. From such a viewpoint, it is more preferable that the thicknesses of the glass sheets are 2.5 mm or less. On the other hand, if the glass thickness is below 1.5 mm, a sufficient strength cannot be ensured when the laminated glass is used as a window member. Also, the glass sheets of the laminated glass may have the same or different thickness.

The laminated glass of the present invention also can be applied to a window for buildings or the like. However, the laminated glass can be preferably used for an automobile window that has a strong need for preventing the decrease in transparency due to delamination. In other words, the automobile window of the present invention comprises the laminated glass of the present invention as a window member. A region of the laminated glass in which the glass sheets push onto each other through an intermediate film can be exposed to the air. According to such a window, the risk of the delamination of the laminated glass can be reduced even if moisture enters or diffuses from the edge of the laminated glass during its long-term use. The automobile windows of the present invention include windshields, side windows, back windows, and roof windows. More particularly, the windows include side windows, back windows, and roof windows, each of which have a glass that can be opened and closed, for example, raised and lowered, and side windows, back windows, and roof windows, each of which have a glass fixed with its edge exposed. Thus, the edge that can be exposed includes both the edge exposed to the air depending on the use and the edge exposed to the air regardless of the use.

(First Embodiment)

Figure 2:
FIG. 2 is a cross-sectional view taken on line A—A' of the laminated glass shown in FIG. 1.

FIG. 1 shows an example of the laminated glass of the present invention. This laminated glass has the shape for being fit into the side door window of an automobile. FIG. 2 shows the shapes of the two glass sheets before bonding in the cross-section taken on line A—A' of FIG. 1. As shown in FIG. 2, the two glass sheets have different cross-sectional shapes in the A—A' direction, so that when trying to put the surfaces of the glass sheets together, their edges contact each other and their central portions are apart from each other. These two glass sheets also have cross-sectional sectional shapes in the B—B' direction before bonding, in which their edges are closed and their central portions are apart from each other, as shown in FIG. 3.

When bonding the surfaces of such a pair of glass sheets through a PVB film with their central portions bent, the glass sheets try to regain their shapes before bonding. This generates the force by which the glass sheets try to be apart from each other (tensile stress with respect to the intermediate film; hereinafter referred to as "tensile stress") in their central portions and the force by which the glass sheets push onto each other (compressive stress with respect to the intermediate film; hereinafter referred to as "compressive stress") at their edges. These tensile stress and compressive stress are partly absorbed by a minor deformation of the intermediate film. However, they locally push and pull the intermediate film in the thickness direction while being totally balanced. The present invention applies these locally occurring stresses to inhibition of the delamination of a laminated glass.

Figure 3:
FIG. 3 is a cross-sectional view taken on line B—B' of the laminated glass shown in FIG. 1.

When a laminated glass is formed by the pair of glass sheets having cross-sectional structures as shown in FIGS. 1–3, the force by which the glass sheets push onto each other occurs at the edges of the laminated glass throughout its entire periphery, preventing the delamination at the edges throughout the entire periphery.

(Second Embodiment)

Figure 4:
FIG. 4 is a cross-sectional view taken on line B—B' of another embodiment of the laminated glass of the present invention shown in a plan view similar to that of FIG. 1.

The B—B' cross-sectional shapes of the two glass sheets of the laminated glass as shown in FIG. 1 are modified in such a manner that the portion where the glass sheets are most apart from each other is closer to the upper edge of the glass than that of FIG. 3, as shown in FIG. 4. A laminated glass is formed by these two glass sheets with a PVB film in a manner similar to that of the first embodiment.

In general, as the width of the space, provided by laying the two glass sheets on each other with their surfaces to be bonded located inside, increases, the tensile stress occurring in the portion increases when the laminated glass is formed. Therefore, when bonding the glass sheets having the cross-sectional shapes of FIG. 4, the region of the tensile stress shifts to an upper portion of the laminated glass from that of the glass sheets having the cross-sectional shapes of FIG. 3. As a result, the compressive stress applied as the reaction to the tensile stress is offset upward. Thus, the stress in the laminated glass can be partly regulated by the shapes of the glass sheets and the degree of the difference in shape.

In this embodiment, the shapes of the glass sheets are set so that a relatively high compressive stress is applied to the upper edge of a side door glass where the penetration of moisture is feared most. However, the shapes are not limited to these shapes. The distribution of the stress is preferably set properly according to the intended use of the laminated glass. Also, the shape of the glass is preferably set by totally considering the ease of bending the glass sheet, the ease of laminating with an intermediate film, and the like.

In carrying out the present invention, no special members are required for the glass sheets and the intermediate film. Normal glass sheets can be used. Sheet-like members, having substantially uniform thickness in at least a region to be bonded, are preferably used as the glass sheets and the intermediate film. General-purpose glass sheets and an intermediate film such as a PVB film satisfy the conditions.

EXAMPLE

Figure 5:
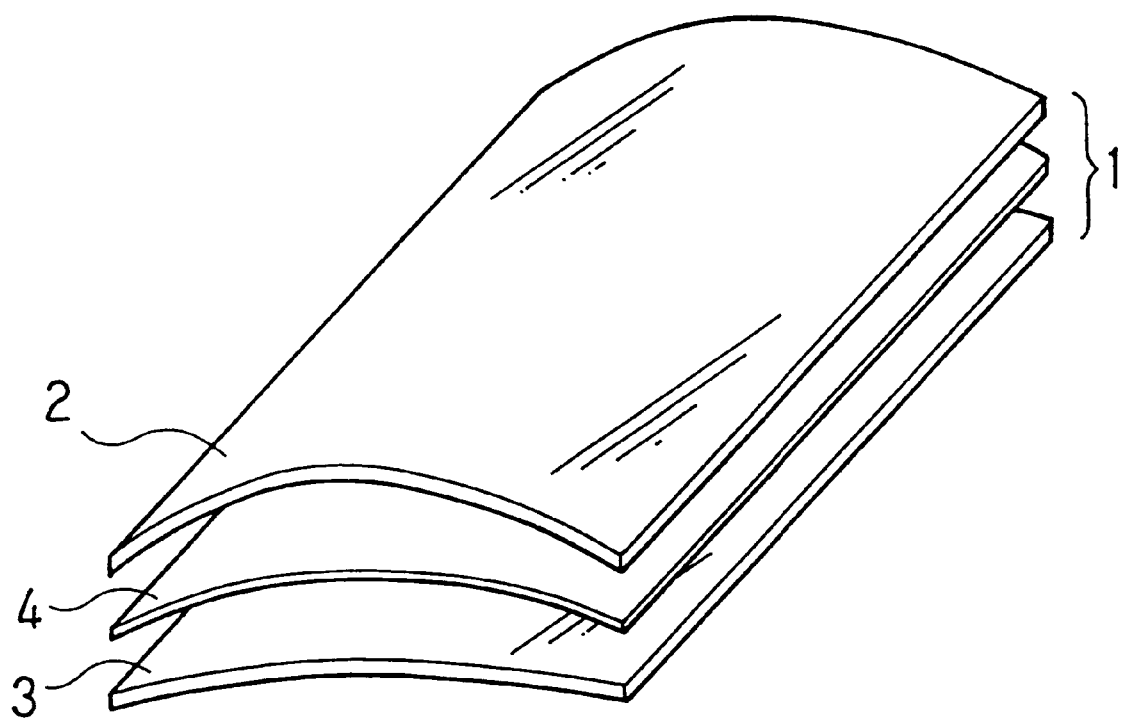
FIG. 5 is a perspective view of the glass sheets and the intermediate film of a laminated glass manufactured in an example.

A laminated glass 1 was manufactured by using bent glass sheets 2 and 3 having curvatures only in a single direction as shown in FIG. 5.

Both the bent glass sheets 2 and 3 are cylindrical glass sheets having a size of 500 mm by 800 mm and a thickness of 2.1 mm. The radius of curvature of the bent glass sheet 2 (1300 mmR) is lower than that of the bent glass sheet 3 (1400 mmR). However, this difference in curvature is within such a range that the surfaces of the two glass sheets adhere to each other when the glass sheets are laid on each other, aligning and contacting their edges, and when the central portions of the glasses are bent. The glass sheets 2 and 3 were put in an inspection die, which supported their edges to maintain their horizontal attitudes, for inspection. The maximum space between the separated central portions of the glass sheets (the distance between each surface) was 1.8 mm.

The glass sheets 2 and 3 were bonded with a PVB film 4 to form a 1350 mmR laminated glass 1. The laminated glass 1 was not distinguishable in appearance from that manufactured by using glass sheets having the same curvature. The laminated glass 1 was subjected to a moisture resistance test in a thermostatic vessel, with its edges exposed. After the test, the laminated glass 1 was transparent in appearance at its linear edges where compressive stress was applied, and therefore no change occurred there. However, it was confirmed that the glass sheets 2 and 3 were delaminated around the centers of the arc-like edges where tensile stress was applied and that the laminated glass was opaque around the centers of these edges. For comparison, laminated glass sheets having the same curvature were manufactured in a manner similar to that of the above example, and subjected to a similar moisture resistance test. It was confirmed that this laminated glass was also opaque around each edge.

As described above, according to the laminated glass of the present invention, the delamination of the glass sheets at their edges, caused by the penetration and diffusion of moisture, can be inhibited without using an edge protective material by applying the force, by which the glass sheets push onto each other through the intermediate film, to the edges of the glass sheets. Also, the automobile window of the present invention utilizes the feature of the laminated glass of the present invention. It can be adapted to reduce the risk of the delamination of the laminated glass during its long-term use and can utilize the high safety of the laminated glass without decreasing the degree of freedom for the design of the window.

The invention may be embodied in other forms without departing from the spirit or essential characteristics thereof. The embodiments disclosed in this application are to be considered in all respects as illustrative and not restrictive, the scope of the invention is indicated by the appended claims rather than by the foregoing description, and all changes which come within the meaning and range of equivalency of the claims are intended to be embraced therein.

What is claimed is:

1. A laminated glass comprising a pair of glass sheets and an intermediate film bonding the pair of glass sheets, wherein glass sheets having different cross-sectional shapes are bonded with the intermediate film while being deformed in such a manner that surfaces of the glass sheets adhere to each other so that the glass sheets push onto each other through the intermediate film in a region including at least a part of the edges of the glass sheets.

2. A laminated glass according to claim 1, wherein each glass sheet has a thickness of 1.5 mm to 3 mm.

3. A laminated glass according to claim 1, wherein the intermediate film is a polyvinyl butyral resin film.

4. A laminated glass produced by bonding a pair of glass sheets with an intermediate film, wherein the surfaces of the glass sheets, when superimposed on each other without the intermediate film so that the surfaces to be bonded face each other, are separate from each other in at least a part of the surfaces in such a range that the surfaces adhere to each other when at least one of the glass sheets is elastically deformed, wherein the glass sheets in the laminated glass push onto each other through the intermediate film in a region including at least a part of the edges of the glass sheets.

5. A laminated glass according to claim 4, wherein the maximum space between the surfaces superimposed on each other without the intermediate film is 1 mm or more.

6. A laminated glass according to claim 4, wherein each glass sheet has a thickness of 1.5 mm to 3 mm.

7. A laminated glass according to claim 4, wherein the intermediate film is a polyvinyl butyral resin film.

8. An automobile window having a laminated glass comprising a pair of glass sheets and an intermediate film bonding the pair of glass sheets, wherein the glass sheets having different cross-sectional shapes are bonded with the intermediate film while being deformed in such a manner that surfaces of the glass sheets can adhere to each other so that the glass sheets push onto each other through the intermediate film in a region including at least a part of the edges of the glass sheets.

9. An automobile window according to claim 8, wherein each glass sheet has a thickness of 1.5 mm to 3 mm.

10. An automobile window according to claim 8, wherein the intermediate film is a polyvinyl butyral resin film.

11. An automobile window according to claim 8, wherein the region in which the glass sheets push onto each other includes a part of the edges which can be exposed to the air.

12. An automobile window having a laminated glass produced by bonding a pair of glass sheets with an intermediate film, wherein the surfaces of the glass sheets, when superimposed on each other without the intermediate film so that the surfaces to be bonded face each other, are separate from each other in at least a part of the surfaces in such a range that the surfaces can adhere to each other when at least one of the glass sheets is elastically deformed, wherein the glass sheets in the laminated glass push onto each other through the intermediate film in a region including at least a part of the edges of the glass sheets.

13. An automobile window according to claim 12, wherein the maximum space between the surfaces superimposed on each other without the intermediate film is 1 mm or more.

14. An automobile window according to claim 12, wherein each glass sheet has a thickness of 1.5 mm to 3 mm.

15. An automobile window according to claim 12, wherein the intermediate film is a polyvinyl butyral resin film.

16. An automobile window according to claim 12, wherein the region in which the glass sheets push onto each other includes a part of the edges which can be exposed to the air.

* * * * *